3,384,654
PROCESS FOR THE MANUFACTURE OF
CYANOACETIC ACID ESTERS
Kurt Sennewald and Alfred Hauser, Knapsack, near Cologne, and Winfried Lork, Friesheim, Germany, assignors to Knapsack Aktiengesellschaft, Knapsack, near Cologne, Germany, a corporation of Germany
No Drawing. Filed Aug. 3, 1965, Ser. No. 476,996
Claims priority, application Germany, Aug. 12, 1964,
K 53,731
6 Claims. (Cl. 260—464)

ABSTRACT OF THE DISCLOSURE

A process to produce cyanoacetic acid esters by reacting a halogenoacetic acid ester of the formula $$\text{Hal-CH}_2\text{—COOR}$$

wherein Hal is halo and R is an aliphatic, cycloaliphatic or aralkyl; with an alkali metal cyanide in an inert solvent in the presence of hydrogen cyanide; effecting the reaction at a temperature of about 20–25° C. under a pressure of about 1–6 atmospheres.

In particular, the invention relates to the production of the formula $$\text{CN—CH}_2\text{—COOR}$$

in which R stands for aliphatic and cycloaliphatic radicals free of aliphatic unsaturation and aralkyl radicals, and Hal is defined as chloro, bromo and iodo.

---

Cyanoacetic acid esters, which are used as feed material for numerous syntheses in the pharmaceutical and plastic fields, have been prepared heretofore, e.g. by reacting the sodium salt of chloroacetic acid with an alkali metal cyanide in an aqueous solution, the resulting cyanoacetic acid being isolated from the aqueous phase and thereafter esterified with an alcohol. If isolating the cyanoacetic acid, e.g. by evaporation of the aqueous solution or by extraction with a suitable extractant, is deemed to constitute a separate process step, this conventional technique must be termed a three-stage process, wherein more especially the second and third process steps incur losses of yield due to hydrolysis of the cyanoacetic acid or due to incomplete extraction of the aqueous phase or due to incomplete esterification of the acid, which means that the cyanoacetic acid ester will be obtained in a yield as low as 70 to 80%.

A further process for making cyanoacetic acid alkyl esters has been disclosed in German Patent No. 640,509 which teaches allowing chloroacetic acid alkyl esters to act upon an alkali metal cyanide at an elevated temperature in the presence of a free organic acid. In this process, the reaction time is as long as 24 hours which substantially favors the formation of by-products, e.g. cyano-succinic acid esters or β-cyano-tricarballyl esters so that the average yield of cyanoacetic acid esters will be as low as 70%.

Still further, cyanoacetic acid esters can be produced by the method disclosed in U.S. Patent No. 2,985,682 wherein a halogenoacetic acid ester is caused to react with hydrogen cyanide and ammonia in an inert solvent, but this is a very difficult process which cannot be used commercially. The relatively long reaction period of about 7 hours is unsatisfactory in this process which promotes by-product formation as the process of German Patent No. 640,509. Only very accurate maintenance of the reaction conditions, especially maintenance of a reaction temperature of 0° C., permits obtaining good yields of cyanoacetic acid esters as working at a temperature as low as 2–6° C. does not permit the formation of chloroacetamide or glycinamide as by-products to be obviated. In addition thereto, it is a rather complicated procedure to remove ammonium chloride which is obtained as a by-product and is dissolved in the reaction product, e.g. by treating the solution with water, as this may entrain partial hydrolysis of the ester.

Still further, it has been proposed to prepare cyanoacetic acid esters by reacting a halogenoacetic acid ester with an excess of hydrogen cyanide in the presence of an alkali metal alcoholate. The alcohol used as a solvent for the alkali metal alcoholate is recovered once the reaction is complete. The alcohol recovered contains hydrogen cyanide which is disadvantageous for its further use in the preparation of alcoholate. It is therefore necessary to subject the contaminated alcohol to a special purifying treatment.

It has now been found that cyanoacetic acid esters can be prepared by a technically simple process which obviates the disadvantages associated with conventional methods and enables the esters to be obtained in good yields for a short reaction time of the starting components. The process can be carried out continuously without difficulty.

The process of the present invention can be used for making cyanoacetic acid esters of the general formula:

$$\text{CN—CH}_2\text{—COOR}$$

in which R stands for optionally substituted aliphatic, cycloaliphatic or aralkyl radicals free of aliphatic unsaturation, wherein a halogenoacetic acid ester of the formula Hal-CH$_2$—COOR, in which R has the meaning given above, and an alkali metal cyanide in an inert solvent are reacted with one another in at least equivalent proportions in the presence of hydrogen cyanide, at a temperature within the range of about 20 to 250° C. and under pressure of about 1 to 6 atmospheres, the reaction is completed, precipitated alkali metal halide is separated, and remaining solution is distilled to yield cyanoacetic acid ester.

The cyanoacetic acid esters are obtained in the present process with an average yield of 85–90% of the theoretical, related to the amount of alkali metal cyanide used or related to the halogenoacetic acid ester transformed. This is a very unexpected result bearing in mind that the process disclosed by S. Goldschmidt and G. Gräfinger (Berichte der Deutschen Chemischen Gesellschaft, vol. 68, page 282, 1935) which is an improvement in or modification of the process disclosed by W. A. Noyes (J. American Chem. Soc., 26, 1545, 1904), and wherein a chloroacetic acid ester is reacted with potassium cyanide in methanol, produces the cyanoacetic acid ester in a yield as low as 54% of the theoretical even after a reaction period of 5 hours.

The starting products suitable for use in carrying out the process of the present invention include chloro, bromo or iodoacetic acid esters whose alcoholic component preferably has up to 6 carbon atoms and may carry an alkoxy, halogeno, cyano, nitro or amino-group or a similar group as substituent.

The alkali metal cyanides, preferably the cyanides of sodium or potassium, are reacted in most finely divided form with at least an equivalent proportion, and preferably with an excess of the halogenoacetic acid ester. It is especially advantageous to use 1.1 to 6 mols halogenoacetic acid ester per mol alkali metal cyanide.

The cyano-ester yields are decisively influenced by the concentration of hydrocyanic acid in the reaction solution, 0.1 to 4 mols hydrocyanic acid being preferably used per mol alkali metal cyanide. The hydrocyanic acid is not consumed during the reaction and is intended to prevent the halogenoacetic acid ester from undergoing undesired secondary reactions with cyano-ester which has already formed to result in the formation of by-products.

The inert solvents are preferably the alcohols which correspond to the alcoholic component of the halogenoacetic acid esters, e.g. methanol, ethanol, isopropyl alcohol, glycol monomethylether, cyclohexanol and other alcohols. It is also possible to carry out the reaction in dimethylformamide or dimethylsulfoxide which are known considerably to accelerate nucleophile substitution reactions.

The reaction components are generally reacted at boiling temperature under atmospheric pressure.

An exemplary mode of carrying out the process of the present invention comprises introducing finely ground alkali metal cyanide so rapidly into a boiling solution of halogenoacetic acid ester, hydrocyanic acid and alcohol that the reaction mixture is kept boiling. It is also possible to introduce an alcoholic suspension of sodium cyanide into a solution of halogenoacetic acid ester and hydrocyanic acid. The total average reaction time amounts to about 0.3–4 hours. After the reaction is complete and after cooling, alkali metal halide which precipitates from the reaction mixture is separated from the reaction solution by centrifugation or filtration. Remaining reaction solution is worked up by distillation to recover the cyanoester. To this end, the solvent is distilled off together with the hydrocyanic acid and unreacted halogeno-acetic acid ester, and the cyano-acetic acid ester which remains as distillation residue is purified once again by distilling it. After admixture of fresh halogenoacetic acid ester, the halogenoacetic acid ester recovered can be used again.

Small proportions of less than 1% of a seminitrile of α-imino-succinic acid ester, which is obtained as a by-product during the reaction, can be split into cyanoacetic acid ester and hydrocyanic acid, the splitting taking place during the distillation carried out to obtain the pure cyanoacetic acid ester and being brought about by adding 0.01 to 1% by weight of a tertiary base, e.g. triethanolamine, triphenylamine or quinoline. No such base need be added when the reaction solution is worked up by continuous distillation because the bulk of the seminitrile is then distilled off together with the chloroacetic acid ester to decompose again on being reacted with the alkali metal cyanide.

The simple execution, short reaction times and more especially the high cyanoacetic acid ester yields averaging 85 to 90% distinguish the process of the present invention. For isolating the cyano ester from the reaction solution, it is merely necessary to distil off low boiling components and then to distil the cyano ester to obtain it in pure form. The inexpensive alkali metal cyanide ensures that the process can be carried out under economical conditions.

Example 1

A boiling solution of 1085 grams (10 mols) chloroacetic acid methylester, 270 grams (10 mols) hydrocyanic acid and 100 cc. methanol was admixed dropwise, within 40 minutes, with a suspension of 245 grams (5.0 mols) NaCN in 400 cc. methanol. The reaction mixture was boiled for a further 140 minutes under reflux, then cooled at 0° C. and precipitated sodium chloride was separated from the liquid phase by filtration. The sodium chloride-free solution was subjected to fractional distillation, methanol and hydrocyanic acid as the low boiling components were driven off, and 536.8 grams (4.95 mols) chloroacetic acid methyl ester were recovered. The cyanoacetic acid methylester obtained as distillation residue was admixed with 1 gram triethanolamine and distilled under reduced pressure to obtain it in pure form; $B.P._{10}$:86° C. The yield was 448 grams (4.52 mols) or 90.4% of the theoretical, related to the amount of NaCN used, or 89.5%, related to the amount of chloroacetic acid methylester which underwent conversion.

Example 2

A boiling solution of 814 grams (7.5 mols) chloroacetic acid methylester, 67.5 grams (2.5 mols) hydrocyanic acid and 700 cc. methanol was admixed, within 40 minutes, with 245 grams (5 mols) finely ground NaCN having a grain size of up to 0.4 mm. The reaction mixture was boiled for a further 4 hours under reflux and then worked up in the manner set forth in Example 1. By distilling the mixture, 259.4 grams (2.39 mols) chloroacetic acid methylester were recovered as the distillate in addition to methanol and hydrocyanic acid. The cyanoacetic acid methylester was distilled to obtain it in pure form. The yield was 446.0 grams (4.5 mols) or 90.0% of the theoretical, related to the amount of NaCN used, or was 88.0% of the theoretical, related to the chloroacetic acid methyl ester which underwent conversion.

Example 3

A boiling solution of 1085 grams (10 mols) chloroacetic acid methylester, 270 grams (10 mols) hydrocyanic acid and 100 cc. methanol was admixed within 7 minutes with a suspension, which had been obtained by grinding 245 grams (5.0 mols) NaCN and then suspending the ground material in 400 cc. methanol by means of an Ultra-Turrax device. The reaction solution was boiled for 1 hour under reflux and then worked up as usual. 540 grams (4.98 mols) chloroacetic acid methylester were recovered by distilling off the readily boiling components. Distillation of the cyanoacetic acid methylester to obtain it in pure form ($B.P._{10}$:86° C.) gave 436.7 grams (4.41 mols) corresponding to a yield of 88.1%, related to the NaCN used, or of 87.8%, related to the chloroacetic acid methylester which underwent conversion.

Example 4

A solution of 919 grams (7.5 mols) chloroacetic acid ethylester, 62.5 grams (2.5 mols) hydrocyanic acid and 100 cc. ethanol was heated to boiling. The solution so obtained was admixed with vigorous stirring, within 40 minutes, with a finely divided suspension of 245 grams (5.0 mols) NaCN in 350 cc. ethanol. The whole was heated for a further 140 minutes under reflux, cooled at 0° C. and the reaction mixture was worked up in the manner set forth in Example 1. Ethanol and hydrocyanic acid were driven off and 344 grams (2.8 mols) chloroacetic acid ethylester were recovered from the reaction mixture by distillation. The pure cyanoacetic acid ethylester ($B.P._{10}$:103° C.)

obtained after distillation was obtained in a yield of 455.2 grams (4.03 mols), corresponding to a yield of 80.6% of the theoretical, related to the sodium cyanide used, or corresponding to 85.7%, related to the chloroacetic acid ethylester which underwent conversion.

Example 5

A boiling solution of 686 grams (4.5 mols) chloroacetic acid-(2-methoxyethyl)-ester ($B.P._{10}$:81° C.) and 40.5 grams (1.5 mols) hydrocyanic acid in 100 cc. glycol monomethylether was gradually admixed, within 40 minutes, with a suspension of 147 grams (3.0 mols) NaCN in 300 cc. glycol monomethylether. The whole was boiled for a further 140 minutes with agitation, the reaction mixture was cooled at 0° C. and worked up in the manner described above. Solvent and hydrocyanic acid were distilled off and 201.6 grams (1.32 mols) chloroacetic acid-(2-methoxyethyl)-ester were recovered. The cyanoacetic acid-(2-methoxyethyl)-ester had a boiling point of 93–95° C. under a pressure of 1 mm. and was obtained in a yield of 356 grams (2.49 mols), corresponding to a yield of 83% of the theoretical, related to the NaCN used, or corresponding to 78.3%, related to the chloroacetic acid-(2-methoxyethyl)-ester which underwent conversion.

We claim:

1. A process for preparing cyanoacetic acid esters of the formula CN—CH$_2$—COOR wherein R is defined as aliphatic, cycloaliphatic, aralkyl or the corresponding substituted radicals having as sole substituents members selected from the group consisting of alkoxy, halo, cyano, nitro and amino, said radicals being free of aliphatic unsaturation; which comprises contacting a halogenoacetic acid ester of the formula $$\text{Hal-CH}_2\text{—COOR}$$

wherein Hal is defined as chloro, bromo and iodo and R is as above defined; with an alkali metal cyanide reactant in an inert solvent in the presence of hydrogen cyanide; effecting the reaction at a temperature of about 20–250° C. under a pressure of about 1–6 atmospheres; and recovering the resulting cyanoacetic acid ester.

2. The process of claim 1 wherein the alkali metal of the alkali metal cyanide reactant is sodium or potassium and the molar ratio of cyanide reactant to ester is about 1:1.1–6.

3. The process of claim 1 wherein the inert solvent is a member selected from the group consisting of methanol, ethanol, isopropyl alcohol, glycol monomethyl-ether, cyclohexanol, dimethylformamide and dimethylsulfoxide.

4. The process of claim 1 wherein 0.1–4 mols hydrogen cyanide are used per mol of alkali metal cyanide reactant.

5. The process of claim 1 wherein the cyanoacetic acid ester product is admixed with 0.01–1% by weight of a tertiary amine base, related to the crude cyano-ester, and recovered by distillation.

6. The process of claim 5 wherein the tertiary amine base is a member selected from the group consisting of triethanolamine, triphenylamine and quinoline.

References Cited

UNITED STATES PATENTS 2,985,682   5/1961   Raffelson _____ 260—465.4 XR

JOSEPH P. BRUST, *Primary Examiner.*